(12) United States Patent
Kuno et al.

(10) Patent No.: US 7,407,146 B2
(45) Date of Patent: Aug. 5, 2008

(54) COMPOSITE MATERIAL AND RESIN MOLD

(75) Inventors: Takaki Kuno, Kyoto (JP); Keiji Maeda, Kyoto (JP); Yosinori Noguchi, Kyoto (JP); Satoshi Kitaoka, Nagoya (JP); Naoki Kawashima, Nagoya (JP)

(73) Assignees: Towa Corporation, Kyoto (JP); Japan Fine Ceramics Center, Nagoya (JP)

( * ) Notice: Subject to any disclaimer, the term of this patent is extended or adjusted under 35 U.S.C. 154(b) by 323 days.

(21) Appl. No.: 11/024,484

(22) Filed: Dec. 30, 2004

(65) Prior Publication Data
US 2005/0154113 A1 Jul. 14, 2005

(30) Foreign Application Priority Data
Jan. 9, 2004 (JP) .............................. 2004-004543

(51) Int. Cl.
*B29C 33/40* (2006.01)
(52) U.S. Cl. ..................................................... 249/115
(58) Field of Classification Search .................. 249/115
See application file for complete search history.

(56) References Cited
U.S. PATENT DOCUMENTS
2,983,570 A * 5/1961 Lux ......................... 428/307.3
3,617,364 A * 11/1971 Jarema et al. ............. 428/307.3
4,309,380 A * 1/1982 Sauer ........................... 264/511

FOREIGN PATENT DOCUMENTS
EP  1331081 A1 * 7/2003
JP  7-329099 A   12/1995

* cited by examiner

*Primary Examiner*—Robert B Davis
(74) *Attorney, Agent, or Firm*—Birch, Stewart, Kolasch & Birch, LLP

(57) ABSTRACT

A composite material used for a resin mold for forming hardened resin by hardening fluid resin is provided. The composite material comprises a first material having excellent wear resistance against the fluid resin and a second material having excellent unwettability against the fluid resin. The resin mold comprises a substrate of the first material, a large number of pores each provided to form an opening on a surface of the substrate opposite to the fluid resin and a film of the second material formed along the inner wall surface of each pore at least around the opening. Each of the large number of pores is a communicating hole connecting the surface opposite to the fluid resin and the remaining surface with each other. Therefore, releasability between a mold surface and the hardened resin and wear resistance of the composite material against the fluid resin can be improved.

8 Claims, 4 Drawing Sheets

COMPOSITE MATERIAL AND RESIN MOLD

This nonprovisional application is based on Japanese Patent Application No. 2004-004543 filed with the Japan Patent Office on Jan. 9, 2004, the entire contents of which are hereby incorporated by reference.

BACKGROUND OF THE INVENTION

1. Field of the Invention

The present invention relates to a composite material composed of different materials and a resin mold of this composite material used for manufacturing a molding by hardening fluid resin.

2. Description of the Background Art

Transfer molding or injection molding is employed for conventional resin molding. According to this method, fluid resin is charged into a cavity provided in a resin mold. Thereafter the charged fluid resin is hardened to form hardened resin. Consequently, a molding having the hardened resin is formed. In the aforementioned method, releasability between the hardened resin and the surface of the mold must be so improved that the molding can be easily taken out.

For example, an organic material such as polytetrafluoroethylene or silicone rubber having excellent unwettability against the fluid resin is favorable as a surface modification material promoting release between the mold and the hardened resin. In practice, there is proposed a method of coating a mold surface with the organic material by spraying or applying this organic material onto the mold surface (e.g., Japanese Patent Laying-Open No. 7-329099 (1995), pp. 3-4).

In order to seal a chip-type electronic component such as an LSI chip mounted on a lead frame or a printed board with resin, thermosetting resin such as epoxy resin, for example, containing a ceramic filler is used as fluid resin. This ceramic filler wears the surface of the mold, i.e., the mold surface. In order to avoid this wear, a film of a wear-resistant inorganic hard material such as Cr, TiC or CrN, for example is formed on the mold surface. The film of the inorganic hard material is formed by coating the mold surface with the wear-resistant inorganic hard material by plating, PVD (physical vapor deposition) or CVD (chemical vapor deposition).

However, the aforementioned prior art has the following problems:

First, the organic material such as polytetrafluoroethylene or silicone rubber employed for coating the mold surface is easily worn by the ceramic filler contained in the fluid resin. Therefore, it is difficult to singly use this organic material as the surface modification material for the mold.

Second, the wear-resistant inorganic hard material such as Cr, TiC or CrN constituting the film formed on the mold surface is so insufficient in unwettability against the fluid resin that releasability between the fluid resin and the mold surface is insufficient. Further, this inorganic material has a high elastic coefficient, and the difference between the thermal expansion coefficients of the inorganic material and the material for the mold is large. Therefore, remarkable thermal stress is caused on the interface between the film of the inorganic material and the mold surface in a cooling process after formation of the film. Thus, the film of the inorganic material may be separated from the mold surface due to stress repetitively caused during application of the mold.

The present invention has been proposed in consideration of the aforementioned problems, and an object thereof is to improve, in a composite material used for a portion coming into contact with fluid resin, low adhesiveness between the surface of the composite material and hardened resin, more specifically releasability between the resin and a mold surface when the composite material is applied to a resin mold, while improving wear resistance of the composite material against the fluid resin.

SUMMARY OF THE INVENTION

In order to attain the aforementioned object, a composite material according to a first aspect of the present invention is used for a portion coming into contact with fluid resin. This composite material comprises a first material having excellent wear resistance against the fluid resin and a second material having excellent unwettability against the fluid resin. The first material and the second material are hybridized with each other.

According to the aforementioned structure, the first and second materials are fused with each other at a molecular level. Therefore, the composite material exhibits excellent wear resistance against the fluid resin and excellent low adhesiveness against hardened resin formed by hardening the fluid resin, i.e., releasability.

A composite material according to a second aspect of the present invention is used for a portion coming into contact with fluid resin. This composite material comprises a substrate containing a first material having excellent wear resistance against the fluid resin, a plurality of pores each provided to form an opening on a surface of the substrate opposite to the fluid resin and a film, formed along the inner wall surface of each of the plurality of pores at least around the opening, containing a second material having excellent unwettability against the fluid resin.

According to the aforementioned structure, the composite material exhibits wear resistance and releasability similarly to the aforementioned composite material. Also when releasability against hardened resin is reduced on the surface opposite to the fluid resin, the releasability can be recovered by grinding the surface thereby exposing a new surface of the composite material containing the second material.

In the composite material according to the second aspect of the present invention, each of the plurality of pores is preferably a communicating hole connecting the surface opposite to the fluid resin and the remaining surface with each other According to this structure, a gas component contained in the fluid resin can be removed through the communicating hole.

A composite material according to a third aspect of the present invention is used for a portion coming into contact with fluid resin. This composite material comprises a substrate containing a first material having excellent wear resistance against the fluid resin, a plurality of pores each provided to form an opening on a surface of the substrate opposite to the fluid resin and a charge part, charged into each of the plurality of pores at least around the opening, having excellent unwettability against the fluid resin.

Also according to the aforementioned structure, the composite material exhibits wear resistance and releasability similarly to the aforementioned composite materials. Also when releasability against hardened resin is reduced on the surface opposite to the fluid resin, further, the releasability can be recovered by grinding the surface thereby exposing a new surface of the composite material containing the second material.

A resin mold according to a fourth aspect of the present invention has a cavity charged with fluid resin, is used for manufacturing a molding containing hardened resin obtained by hardening the fluid resin, and prepared from a composite material. This composite material comprises a first material having excellent wear resistance against the fluid resin and a second material having excellent unwettability against the fluid resin. The first material and the second material are hybridized with each other.

According to the aforementioned structure, the resin mold has the composite material exhibiting wear resistance and releasability.

A resin mold according to a fifth aspect of the present invention has a cavity charged with fluid resin, is used for manufacturing a molding containing hardened resin obtained by hardening the fluid resin, and prepared from a composite material. This composite material comprises a substrate containing a first material having excellent wear resistance against the fluid resin, a plurality of pores each provided to form an opening on a surface of the substrate opposite to the fluid resin and a film, formed along the inner wall surface of each of the plurality of pores at least around the opening, containing a second material having excellent unwettability against the fluid resin.

According to the aforementioned structure, the resin mold has the composite material exhibiting wear resistance and releasability. Also when releasability against hardened resin is reduced on the surface opposite to the fluid resin, further, the releasability can be recovered by grinding the surface thereby exposing a new surface of the composite material containing the second material.

In the resin mold according to the fifth aspect of the present invention, each of the plurality of pores is preferably a communicating hole connecting the surface opposite to the fluid resin and the remaining surface with each other.

According to this structure, a gas component contained in the fluid resin can be removed through the communicating hole.

A resin mold according to a sixth aspect of the present invention has a cavity charged with fluid resin, is used for manufacturing a molding containing hardened resin obtained by hardening the fluid resin, and prepared from a composite material. This composite material comprises a substrate containing a first material having excellent wear resistance against the fluid resin, a plurality of pores each provided to form an opening on a surface of the substrate opposite to the fluid resin and a charge part, charged into each of the plurality of pores at least around the opening, having excellent unwettability against the fluid resin.

Also according to the aforementioned structure, the resin mold has the composite material exhibiting wear resistance and releasability similarly to the resin mold comprising the aforementioned composite material. Also when releasability against hardened resin is reduced on the surface opposite to the fluid resin, further, the releasability can be recovered by grinding the surface thereby exposing a new surface of the composite material containing the second material.

The foregoing and other objects, features, aspects and advantages of the present invention will become more apparent from the following detailed description of the present invention when taken in conjunction with the accompanying drawings.

DESCRIPTION OF THE INVENTION

Composite materials 3, 10, 19 and 28 and resin molds according to first to fourth embodiments of the present invention are now described with reference to the drawings. FIGS. 1 to 7 schematically illustrate the composite materials 3, 10, 19 and 28 and the resin molds according to the first to fourth embodiments, in order to simplify the description.

Each of the composite materials 3, 10, 19 and 28 according to the first to fourth embodiments is used for a portion coming into contact with fluid resin. Each composite material comprises a first material having excellent wear resistance against the fluid resin and a second material having excellent unwettability against the fluid resin.

First Embodiment

Figure 1:
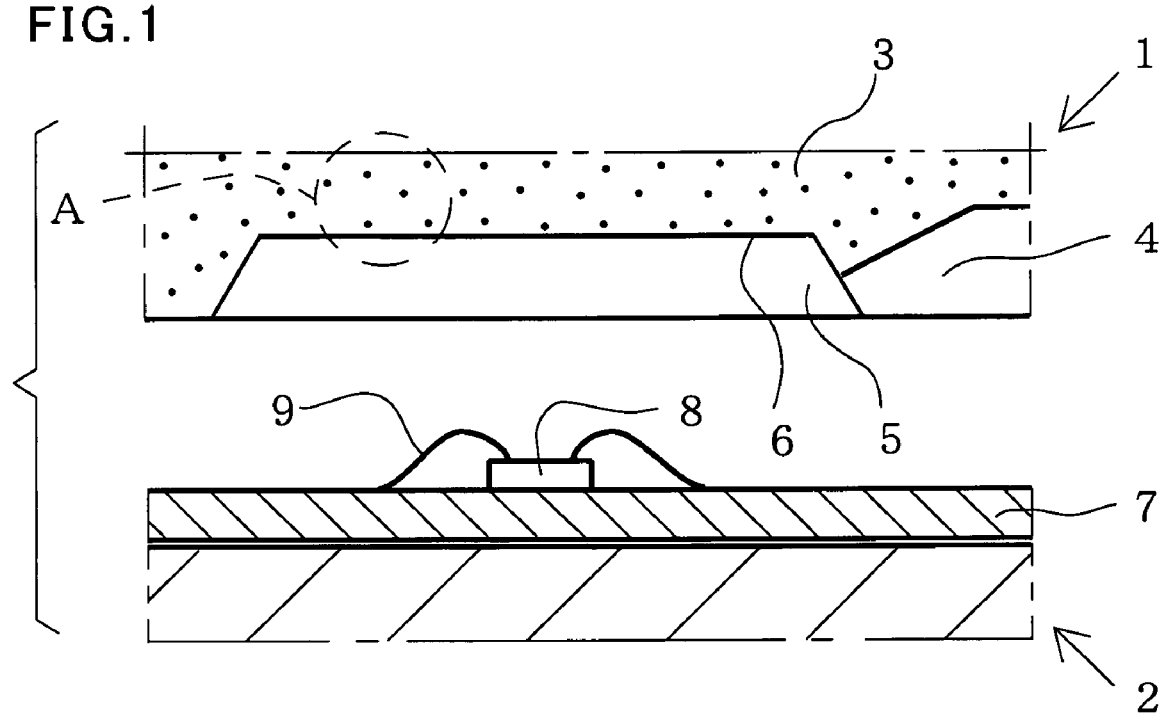
FIG. 1 is a sectional view schematically showing the structure of a composite material according to a first embodiment of the present invention and each of resin molds according to the first embodiment and second and third embodiments of the present invention.

The composite material 3 and the resin mold according to the first embodiment of the present invention are described with reference to FIG. 1. FIG. 1 is a sectional view showing each of the resin molds according to the first to third embodiments of the present invention. The resin mold according to each of the embodiments described below is employed for sealing a chip mounted on a substrate with resin, for example. In this resin sealing, the resin mold stores the wired chip in a cavity thereof. Then, the resin mold is clamped for charging the cavity with fluid resin. Thereafter the fluid resin is hardened to form hardened resin. Consequently, a molding (package) having the substrate and the hardened resin is completed.

As shown in FIG. 1, a resin molding die according to the first embodiment is constituted of an upper mold section 1 and a lower mold section 2. The upper mold section 1 corresponds to the inventive resin mold. The composite material 3 according to the first embodiment is employed for the upper mold section 1. The upper mold section 1 is provided with a resin passage 4 for feeding fluid resin (not shown) and a cavity 5 charged with the fluid resin. Therefore, a mold surface 6 constituted of the resin passage 4 and the cavity 5 exposes the composite material 3. On the other hand, a substrate 7 formed by a lead frame or a printed board is placed on the lower mold section 2 of tool steel or the like. A chip 8 is mounted on the substrate 7. Wires 9 electrically connect electrodes (not shown) of the substrate 7 and the chip 8 with each other.

Operations of the resin mold shown in FIG. 1 are now described. First, the substrate 7 is positioned on the lower mold section 2 and fixed thereto by adsorption or the like. Then, the upper mold 1 is moved down toward the lower mold section 2, so that the upper and lower mold sections 1 and 2 are clamped together. Then, the fluid resin such as thermosetting resin having constant viscosity, for example, is so pressed as to charge the cavity 5 with the fluid resin through the resin passage 4. Then, heaters (not shown) provided on the upper and lower sections 1 and 2 respectively are employed for heating and hardening the fluid resin, thereby forming hardened resin. Then, the upper section 1 is moved up from the lower mold section 2. Thereafter a molding obtained by integrally sealing the substrate 7, the chip 8 and the wires 9 with the hardened resin is taken out.

The composite material 3 according to the first embodiment comprises a first material having excellent wear resistance against the fluid resin and a second material having excellent unwettability against the fluid resin, and the first and second materials are hybridized with each other. The term "hybridization" denotes an operation of fusing an organic material and an inorganic material with each other at a molecular level.

According to the first embodiment, the first material is an inorganic material. A ceramic material such as alumina ($Al_2O_3$), yttria ($Y_2O_3$), zirconia ($ZrO_2$), titania ($TiO_2$), lanthanum oxide ($La_2O_3$), silicon nitride ($Si_3N_4$), silicon carbide (SiC), zirconium boride ($ZrB_2$), zirconium carbide (ZrC), titanium carbide (TiC) or tungsten carbide (WC) or a metallic material such as titanium (Ti), chromium (Cr) or nickel (Ni) can be listed as an example of the first material.

According to the first embodiment, the second material is an organic material. Fluororesin such as polytetrafluoroethylene (PTFE) or silicone resin can be listed as an example of the second material. Each of the first and second materials may be prepared from a single material or a plurality of materials.

According to the first embodiment, the first material having excellent wear resistance against fluid resin and the second material having excellent unwettability against the fluid resin are hybridized with each other for forming the composite material 3 in which the first and second materials are fused with each other at a molecular level. Therefore, the composite material 3 has excellent wear resistance against the fluid resin as well as low adhesiveness against hardened resin obtained by hardening the fluid resin, i.e., releasability. Further, the resin mold prepared from this composite material 3 also has excellent wear resistance against fluid resin and excellent releasability against the fluid resin.

Second Embodiment

Figure 2:
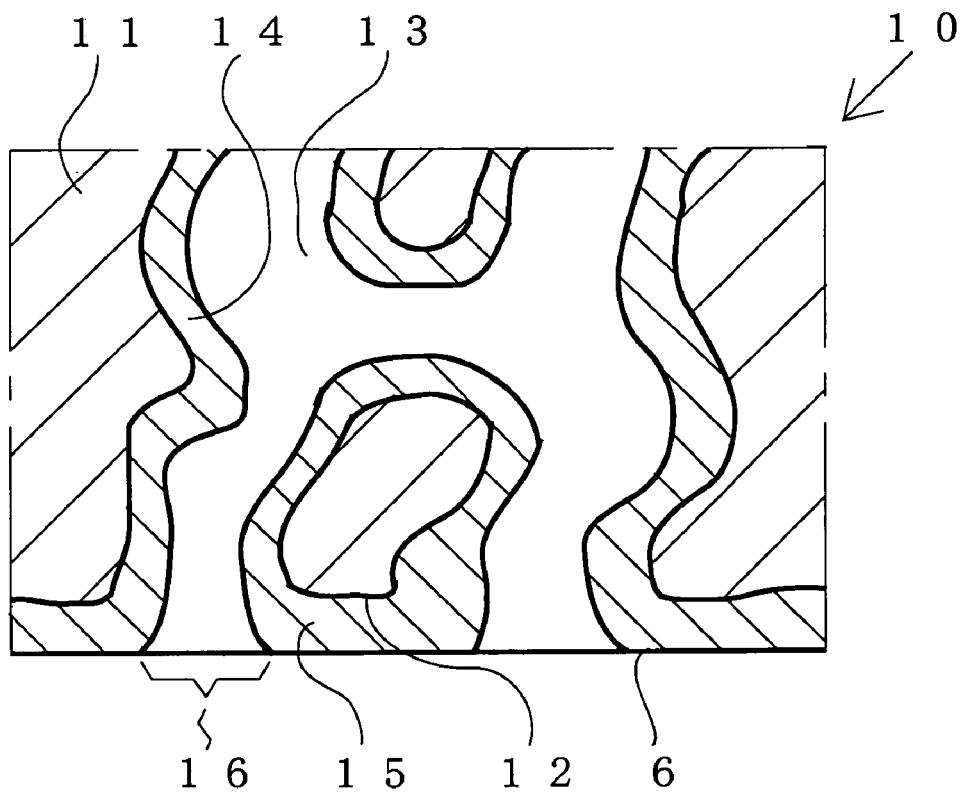
FIG. 2 is an enlarged sectional view of a composite material according to the second embodiment of the present invention.
Figure 3:
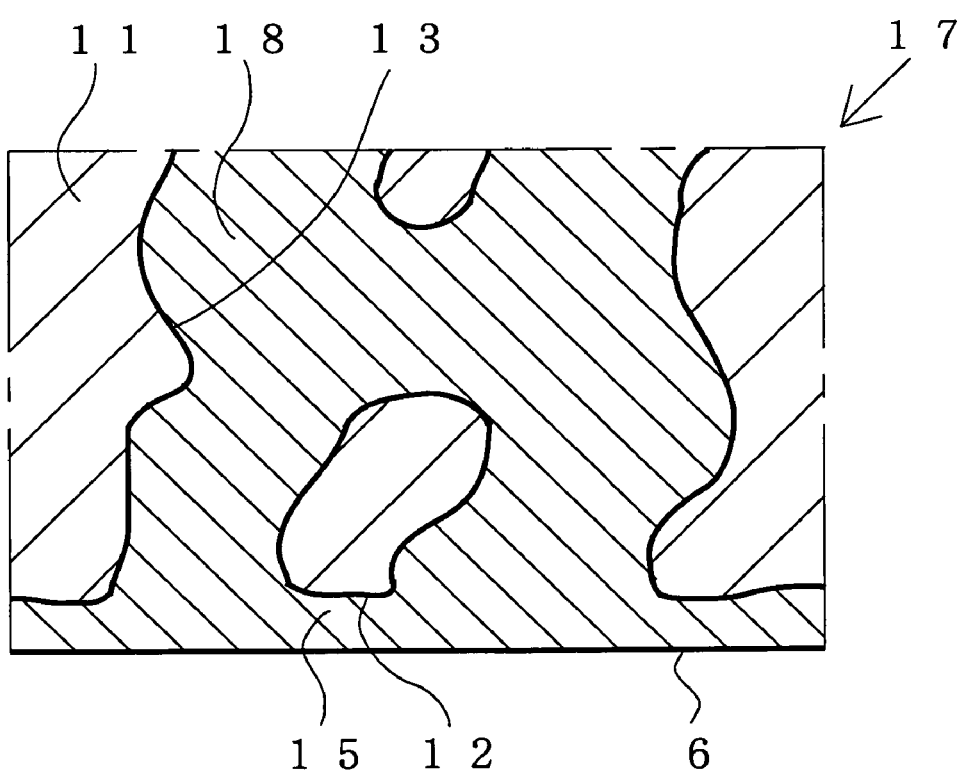
FIG. 3 is an enlarged sectional view of a composite material according to a modification of the second embodiment of the present invention.

The composite material 10 and the resin mold according to the second embodiment of the present invention are described with reference to FIGS. 2 and 3. FIG. 2 is an enlarged sectional view of the composite material 10 according to the second embodiment, and FIG. 3 is an enlarged sectional view of a composite material 17 according to a modification of the second embodiment. Each of FIGS. 2 and 3 corresponds to an enlarged sectional view of a portion A shown in FIG. 1.

According to the second embodiment, the composite material 10 is used in place of the composite material 3 shown in FIG. 1, for constituting the upper section 1 in FIG. 1, i.e., the resin mold. The composite material 10 shown in FIG. 2 has a substrate 11 made of the first material described with reference to the first embodiment. The substrate 11, singly made of the first material such as zirconia ($ZrO_2$), for example, in the second embodiment, may alternatively be made of a plurality of first materials.

A large number of communicating holes (hereinafter referred to as three-dimensional communicating holes) 13 three-dimensionally communicating with each other, extending from a surface 12 of the substrate 11 inward (upward in FIG. 2) and having small pore sizes are formed in the substrate 11. The pore sizes of the three-dimensional communicating holes 13 are not more than 1 μm, for example, smaller than those of molecules of fluid resin and grains of a filler or the like contained in the fluid resin and sufficiently larger than those of molecules of gas in the fluid resin.

Further, the pore sizes of the three-dimensional communicating holes 13 are substantially similar to each other in the depth direction thereof (vertical direction in FIG. 2) as well as in the direction connecting the three-dimensional communicating holes 13 extending in the depth direction with each other (horizontal direction in FIG. 2). Films 14 of the second material described with reference to the first embodiment such as polytetrafluoroethylene (PTFE), for example, are formed on the inner wall surfaces of the three-dimensional communicating holes 13 with proper thicknesses. Surface layers 15 of the second material are preferably formed on a surface of the composite material 10, i.e., a mold surface 6.

The resin mold according to the second embodiment is made of the composite material 10 shown in FIG. 2 in place of the composite material 3 forming the upper section 1 shown in FIG. 1. The composite material 10 and the upper mold section 1 of the composite material 10 attain the following effects respectively:

First, the surface layers 15 and the films 14 formed on the inner wall surfaces of the three-dimensional communicating holes 13 around openings 16 provide excellent releasability against hardened resin (not shown) in resin molding.

Second, the films 14 exposed around the openings 16 come into contact with fluid resin (not shown) also when the surface layers 15 are worn and lost due to continuous resin molding, whereby portions of the films 14 coming into contact with the fluid resin exhibit excellent unwettability against the fluid resin. Therefore, the composite material 10 attains low adhesiveness against the hardened resin, i.e., releasability not only in the initial stage of application but also after application.

Third, the surface 12 of the substrate 11 having excellent wear resistance against the fluid resin is exposed after the surface layers 15 are worn and lost, whereby the composite material 10 attains excellent wear resistance as a whole.

Fourth, the surface of the composite material 10 coming into contact with the fluid resin may be ground if the releasability against the hardened resin is reduced so that a new surface of the composite material 10 including the films 14 is exposed and the releasability is recovered. Further, the fluid resin is sucked from the resin passage 4 and the cavity 5 shown in FIG. 1 through the three-dimensional communicating holes 13, thereby removing a gas component contained in the fluid resin from the resin passage 4 and the cavity 5. At this time, no fluid resin infiltrates into the three-dimensional communicating holes 13. A molding is ejected by injecting high-pressure gas such as compressed air into the resin passage 4 and the cavity 5 shown in FIG. 1 through the three-dimensional communicating holes 13.

According to the second embodiment, the composite material 10 has wear resistance against the fluid resin as well as low adhesiveness against the hardened resin formed by hardening the fluid resin, i.e., releasability. Further, the resin mold prepared from this composite material 10 also has excellent wear resistance against the fluid resin and excellent releasability against the fluid resin. In addition, the gas component contained in the fluid resin can be removed and the molding can be ejected from the resin mold through the three-dimensional communicating holes 13. Further, the releasability reduced in the surface coming into contact with the fluid resin can be recovered by grinding the surface.

According to the second embodiment, the films 14 are formed on the overall inner wall surfaces of the three-dimensional communicating holes 13. However, the films 14 may alternatively be formed only on the inner wall surfaces of the three-dimensional communicating holes 13 around the openings 16. Also in this case, effects similar to those of the films 14 shown in FIG. 2 can be attained.

As shown in FIG. 3, the composite material 17 according to the modification of the second embodiment shown in FIG. 2 is provided with charge parts 18 formed by charging the three-dimensional communicating holes 13 shown in FIG. 2 with the second material. This composite material 17 has no effects of removing the gas component contained in the fluid resin and ejecting the molding. Except this point, however, the composite material 17 attains effects similar to those of the composite material 10 shown in FIG. 2.

According to the composite material 17 shown in FIG. 3, the charge parts 18 of the second material are exposed over an area wider than that in the composite material 10 shown in FIG. 2 also when surface layers 15 are worn and lost. Also after application, therefore, the composite material 17 exhibits releasability close to that in the initial stage of application. The charge parts 18 may be formed in the three-dimensional communicating holes 13 only around the openings 16 shown in FIG. 2. Also in this case, effects similar to those of the composite material 17 shown in FIG. 3 are attained.

The three-dimensional communicating holes 13 may be replaced with pores not opened on both ends, i.e., holes having opened first ends and closed second ends. Also in this case, effects similar to those of the composite materials 10 and 17 according to the second embodiment and the modification thereof can be attained except removal of the gas component contained in the fluid resin and ejection of the molding.

Third Embodiment

Figure 4:
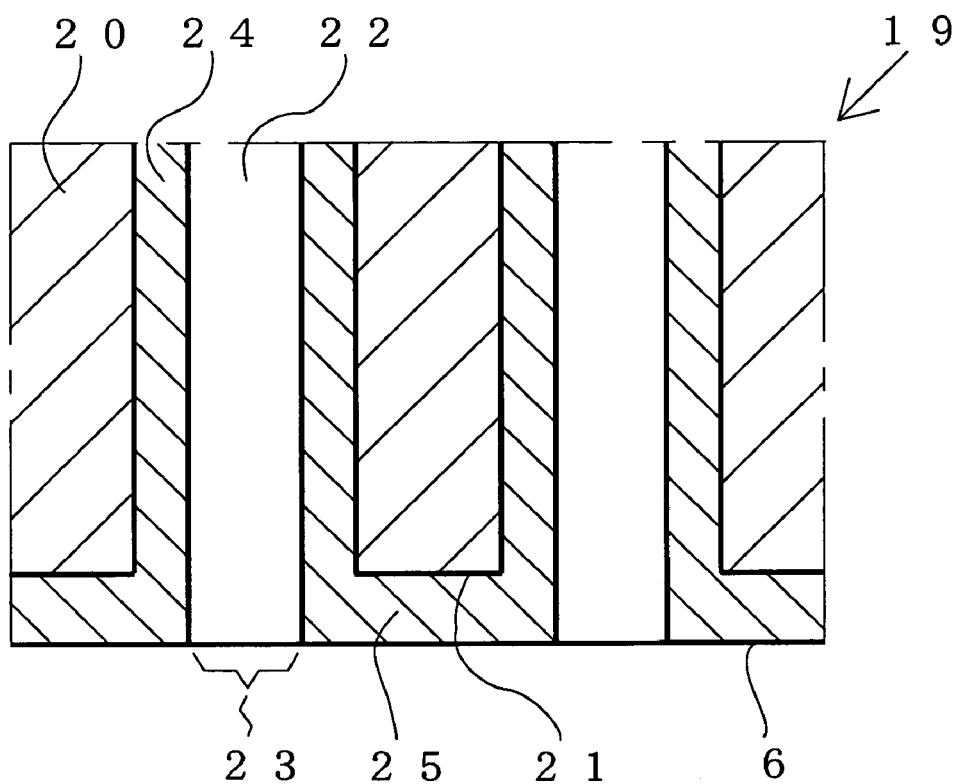
FIG. 4 is an enlarged sectional view of a composite material according to the third embodiment of the present invention.
Figure 5:
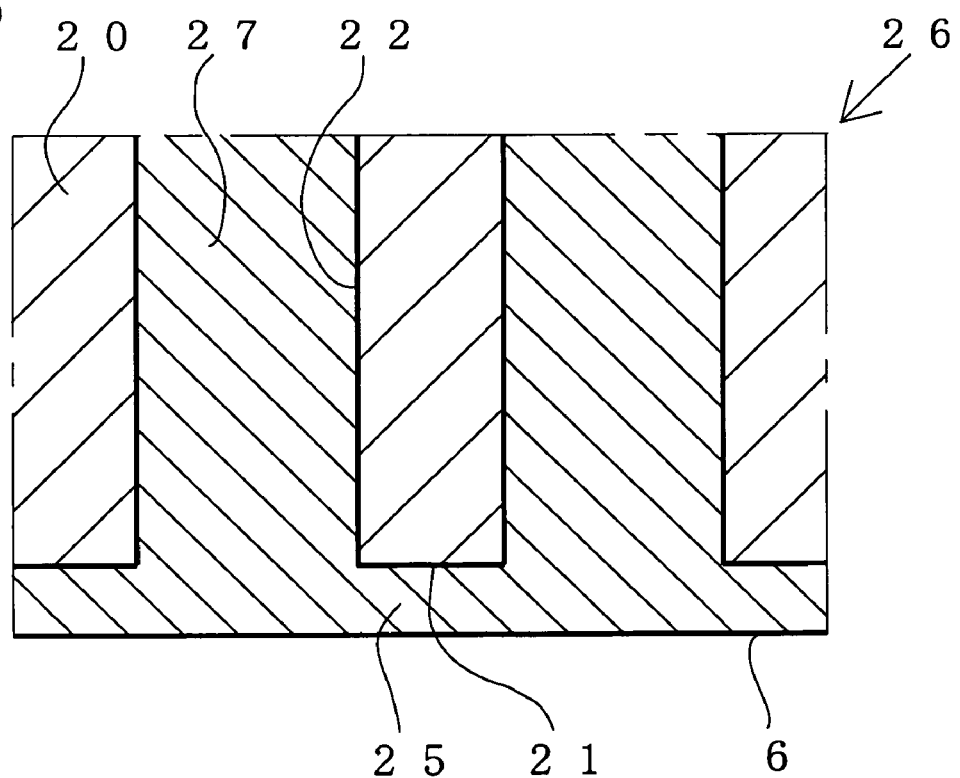
FIG. 5 is an enlarged sectional view of a composite material according to a modification of the third embodiment of the present invention.

The composite material 19 and the resin mold according to the third embodiment of the present invention are described with reference to FIG. 4. FIG. 4 is an enlarged sectional view of the composite material 19 according to the third embodiment, and FIG. 5 is an enlarged sectional view of a composite material 26 according to a modification of the third embodiment. Each of FIGS. 4 and 5 corresponds to an enlarged sectional view of the portion A shown in FIG. 1.

The composite material 19 shown in FIG. 4 has a substrate 20 of the first material described with reference to the first embodiment. The substrate 20, singly made of the first material such as zirconia ($ZrO_2$), for example, in the third embodiment, may alternatively be made of a plurality of first materials. Further, the substrate 20 is provided with a large number of substantially linearly extending communicating holes (hereinafter referred to as one-dimensional communicating holes) 22 extending from a surface 21 of the substrate 20 inward (upward in FIG. 4) substantially perpendicularly to the surface 21 and having small pore sizes.

The pore size of each one-dimensional communicating hole 22 is substantially uniform in the depth direction (vertical direction in FIG. 4), and the pore sizes of the plurality of one-dimensional communicating holes 22 are preferably substantially identical to each other. In other words, the large number of one-dimensional communicating holes 22 have columnar shapes of substantially equal pore sizes. Therefore, openings 23 formed on a mold surface 6 also have substantially identical sizes. Further, portions of the mold surface 6 located between the one-dimensional communicating holes 22 are substantially equal in size to the openings 23.

Films 24 of the second material described with reference to the first embodiment such as polytetrafluoroethylene (PTFE), for example, are formed on the inner wall surfaces of the one-dimensional communicating holes 22 with proper thicknesses. Surface layers 25 of the second material are preferably formed on a surface of the composite material 19, i.e., a mold surface 6.

According to the third embodiment, the composite material 19 is employed in place of the composite material 3 shown in FIG. 1 for forming the upper mold section 1 shown in FIG. 1, i.e., the resin mold. The composite material 19 shown in FIG. 4 and the upper mold section 1 of the composite material 19 attain the following effects respectively, similarly to the composite material 10 and the upper mold section 1 according to the second embodiment:

First, the surface layers 25 and the films 24 formed on the inner wall surfaces of the one-dimensional communicating holes 22 around the openings 23 provide excellent releasability against hardened resin (not shown).

Second, the films 24 exposed around the openings 23 come into contact with fluid resin (not shown) also when the surface layers 25 are worn and lost due to continuous resin molding, whereby portions of the films 24 coming into contact with the fluid resin exhibit excellent unwettability against the fluid resin. Therefore, the composite material 19 attains low adhesiveness against the hardened resin, i.e., releasability also after application, although the releasability is slightly reduced as compared with that in the initial stage of application.

Third, the surface 21 of the substrate 20 having excellent wear resistance against the fluid resin is exposed after the surface layers 25 are worn and lost, whereby the composite material 19 attains excellent wear resistance as a whole.

Fourth, the surface of the composite material 19 coming into contact with the fluid resin may be ground if the releasability against the hardened resin is reduced so that a new surface of the composite material 19 including the films 24 is exposed and the releasability is recovered. Further, the one-dimensional communicating holes 22 are formed in place of the three-dimensional communicating holes 13 shown in FIG. 2. Pressure loss following passage of gas through the one-dimensional communicating holes 22 is smaller than that following passage of gas through the three-dimensional communicating holes 13. In other words, pressure loss of the gas is reduced in the third embodiment. Thus, a gas component contained in the fluid resin can be more effectively removed and a molding can also be more effectively ejected.

In other words, the resin mold according to the third embodiment attains effects similar to those of the resin mold according to the second embodiment, and can more effectively perform removal of the gas component contained in the fluid resin and ejection of the molding through the one-dimensional communicating holes 22.

According to the third embodiment, the films 24 are formed on the overall inner wall surfaces of the one-dimensional communicating holes 22. However, the films 24 may alternatively be formed only on the inner wall surfaces of the one-dimensional communicating holes 22 around the openings 23. Also in this case, effects similar to those of the films 24 shown in FIG. 4 can be attained.

As shown in FIG. 5, the composite material 26 according to the modification of the third embodiment is provided with charge parts 27 formed by charging the one-dimensional communicating holes 22 shown in FIG. 4 with the second material. This composite material 26 also attains effects other than those of removing the gas component contained in the fluid resin and ejecting the molding. According to the composite material 26, further, the charge parts 27 of the second material are exposed over an area wider than that in the composite material 19 shown in FIG. 4 when surface layers 25 are worn and lost. Also after application, therefore, the composite material 26 exhibits excellent releasability close to that in the initial stage of application. The charge parts 27 may be formed in the one-dimensional communicating holes 22 only around the openings 23 shown in FIG. 4. Also in this case, effects similar to those of the composite material 26 shown in FIG. 5 are attained.

The one-dimensional communicating holes 22 may be replaced with pores not opened on both ends, i.e., holes having opened first ends and closed second ends. Also in this case, effects similar to those of the composite materials 19 and 26 according to the third embodiment and the modification thereof can be attained except removal of the gas component contained in the fluid resin and ejection of the molding.

Fourth Embodiment

Figure 6:
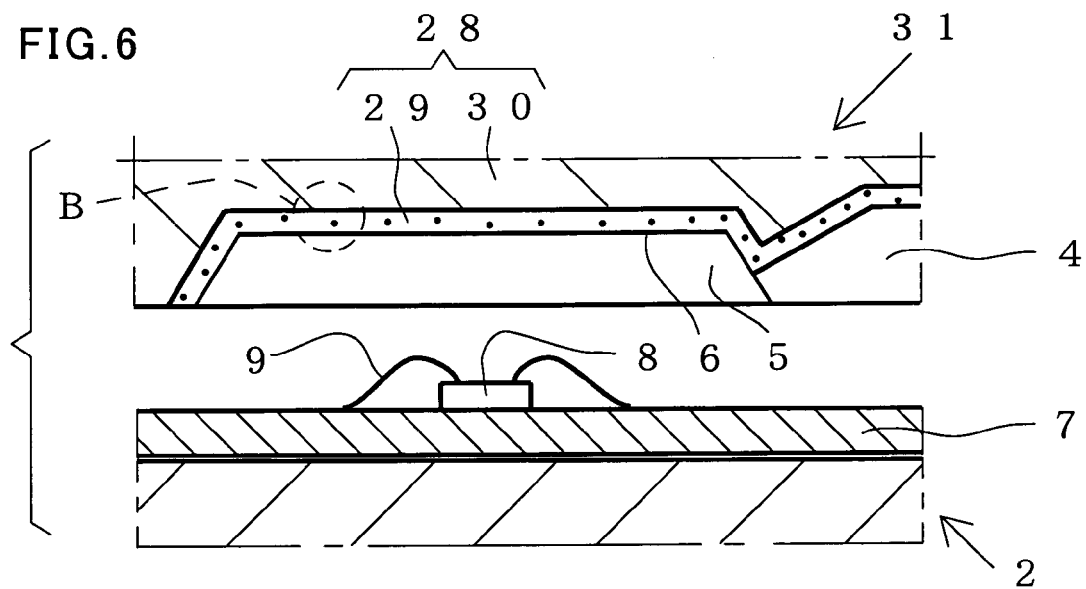
FIG. 6 is a sectional view showing a resin mold according to a fourth embodiment of the present invention.
Figure 7:
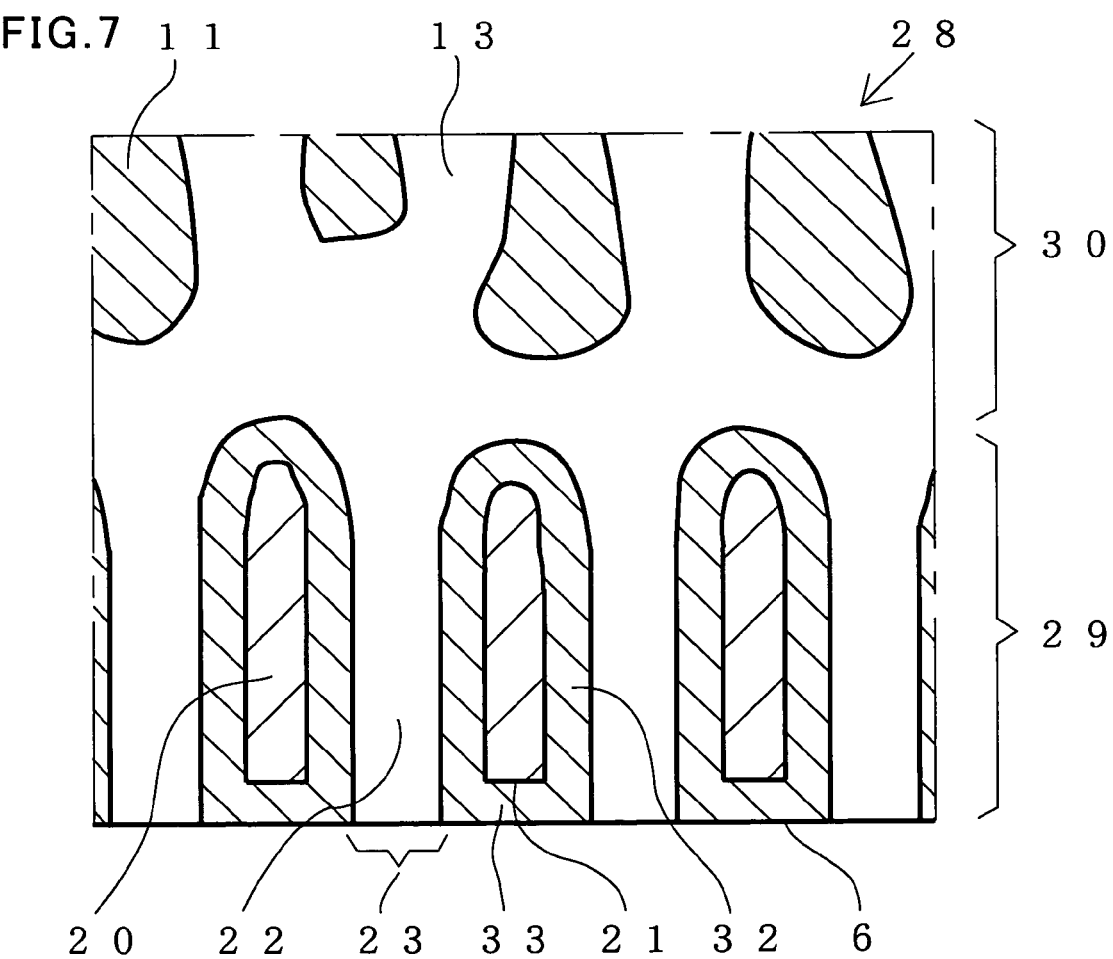
FIG. 7 is an enlarged sectional view of a composite material according to the fourth embodiment of the present invention.

The composite material 28 and the resin mold according to the fourth embodiment of the present invention are described with reference to FIG. 6. FIG. 6 is a sectional view showing the resin mold according to the fourth embodiment, and FIG. 7 is an enlarged sectional view of the composite material 28 according to the fourth embodiment. FIG. 7 corresponds to an enlarged sectional view of a portion B shown in FIG. 6.

As shown in FIG. 6, the composite material 28 according to the fourth embodiment has a two-layer structure formed by a surface part 29 and a support part 30. The composite material 28 is employed for an upper mold section 31 corresponding to the resin mold according to the fourth embodiment. The surface part 29, including a mold surface 6, is made of a material identical to the composite material 19 according to the third embodiment. On the other hand, the support part 30 is made of a material identical to that of the substrate 11 in the second embodiment.

A large number of one-dimensional communicating holes 22 and a large number of three-dimensional communicating holes 13 communicate with each other around the interface between the surface part 29 and the support part 30. Further, surface layers 33 and films 32 of the second material described with reference to the first embodiment are formed on a surface 21 of a substrate 20 and the inner wall surfaces of the one-dimensional communicating holes 22 with proper thicknesses. The pore sizes of the three-dimensional communicating holes 13 are preferably larger than those of the one-dimensional communicating holes 22.

In the composite material 28 according to the fourth embodiment, the surface part 29 including the mold surface 6 has the large number of one-dimensional communicating holes 22 communicating with the three-dimensional communicating holes 13 of the support part 30. The surface part 29 has a small thickness of about 1 μm to several 10 μm, i.e., in order of 1 μm to 10 μm, for example. Further, the pore sizes of the three-dimensional communicating holes 13 are larger than those of the one-dimensional communicating holes 22. According to the composite material 28, therefore, pressure loss resulting from gas successively passing through the three-dimensional communicating holes 13 and the one-dimensional communicating holes 22 is further reduced due to the presence of the three-dimensional communicating holes 13, in addition to effects similar to those of the composite material 19 according to the third embodiment. Thus, removal of a gas component contained in fluid resin and ejection of a molding can be further effectively performed.

Each of the second to fourth embodiments uses a porous body having the three-dimensional communicating holes 13 or the one-dimensional communicating holes 22. While the communicating holes 13 or 22 have substantially identical pore sizes, the composite material may alternatively be formed with communicating holes whose pore sizes are increased as separated from the mold surface 6. In this case, the effect of reducing pressure loss resulting from gas passing through the three-dimensional communicating holes 13 or the one-dimensional communicating holes 22 is further improved.

In each of the second to fourth embodiments, the composite material 10, 19 or 28 is employed for the upper section 1 provided with the cavity 5. Alternatively, the composite material 10, 19 or 28 may be employed for a mold receiving a substrate 7 thereon, i.e., the lower mold section 2. In this case, the substrate 7 can be adsorbed and the molding including the substrate 7 can be ejected through the communicating holes 13 or 22.

In each of the second to fourth embodiments, portions coming into contact with the fluid resin or having a possibility of coming into contact with the fluid resin, i.e., the films 14, 24 or 32 and the surface layers 15, 25 or 33 are made of the second material described with reference to the first embodiment such as polytetrafluoroethylene (PTFE), for example. Alternatively, the films 14, 24 or 32 and the surface layers 15, 25 or 33 may be made of the composite material 3 according to the first embodiment, i.e., a material obtained by hybridizing the first and second materials with each other. Also in this case, effects similar to those of the composite materials 10, 19 and 28 according to the second to fourth embodiments can be attained.

Further, a portion having a possibility of coming into contact with the fluid resin, i.e., the substrate 11 or 20 may be made of the composite material 3 according to the first embodiment, and the films 14, 24 or 32 and the surface layers 15, 25 or 33 may be made of the second material described with reference to the first embodiment. Also in this case, effects similar to those of the composite materials 10, 19 and 28 according to the second to fourth embodiments can be attained.

The resin mold according to each of the first to fourth embodiments is used for sealing the chip 8 mounted on the substrate 7 with resin, for example. Alternatively, the resin mold may be employed for general transfer molding or injection molding for manufacturing a molding by hardening fluid resin charged in the cavity 5.

Each of the first to fourth embodiments is described with reference to transfer molding, for example. However, it is also possible to employ the composite material and the resin mold according to each of the aforementioned embodiments for resin molding for forming hardened resin by hardening the fluid resin in closed upper and lower mold sections after charging the cavity 5 with the fluid resin. For example, the composite material and the resin mold according to each of the aforementioned embodiments can also be employed for resin molding charging the cavity 5 with the fluid resin by potting or resin molding charging the cavity 5 with fluid resin prepared by melting a solid resin material supplied to the cavity 5.

Each of the first to fourth embodiments is described with reference to the composite material and the resin mold employing the same. Alternatively, the composite material according to each of the aforementioned embodiments can be used for application, other than resin molding, such as coating of portions coming into contact with fluid resin, for example.

The composite material according to each of the first to fourth embodiments is formed by mixing an organic material with an inorganic material having three- or one-dimensional communicating holes by vacuum impregnation or pressure compression, for example.

In the vacuum impregnation, the inorganic material is dipped in an organic material having proper viscosity such as liquid poly-tetrafluoroethylene or silicone stored in a container, for example. Then, the organic material is introduced into the three- or one-dimensional communicating holes of the inorganic material by evacuating the container.

In the pressure compression, an inorganic material having three- or one-dimensional communicating holes and a liquid organic material are stored in a container. Then, pressure is applied to the organic material, thereby compressing the organic material. The compressed organic material expands toward a space having low pressure. Consequently, the organic material is fed into the three- or one-dimensional communicating holes of the inorganic material.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite material used for a portion coming into contact with fluid resin, comprising:
    a first material consisting of an inorganic material and having excellent wear resistance against said fluid resin; and
    a second material consisting of an organic material and having excellent unwettability against said fluid resin, wherein
    said first material and said second material are hybridized with each other, such that said inorganic material and said organic material are fused with each other over an entire portion of the composite material at a molecular level.

2. A composite material used for a portion coming into contact with fluid resin, comprising:
    a substrate containing a first material consisting of an inorganic material and having excellent wear resistance against said fluid resin;
    a plurality of pores each provided to form an opening on a surface of said substrate opposing said fluid resin; and
    a film, formed along the inner wall surface of each of said plurality of pores at least around said opening without obstructing said each of said plurality of pores, containing a second material consisting of an organic material and having excellent unwettability against said fluid resin,
    wherein, said first material and said second material are hybridized with each other, such that said inorganic material and said organic material are fused with each other over an entire portion of said film at a molecular level.

3. The composite material according to claim 2, wherein each of said plurality of pores is a communicating hole connecting said surface opposing said fluid resin and the remaining surface with each other.

4. A resin mold, having a cavity charged with fluid resin, used for manufacturing a molding containing hardened resin obtained by hardening said fluid resin and prepared from a composite material, wherein
    said composite material comprises:
    a first material consisting of an inorganic material and having excellent wear resistance against said fluid resin; and
    a second material consisting of an organic material and having excellent unwettability against said fluid resin, and
    said first material and said second material are hybridized with each other, such that said inorganic material and said organic material are fused with each other over an entire portion of said composite material at a molecular level.

5. A resin mold, having a cavity charged with fluid resin, used for manufacturing a molding containing hardened resin obtained by hardening said fluid resin and prepared from a composite material, comprising:
    a substrate containing a first material consisting of an inorganic material and having excellent wear resistance against said fluid resin;
    a plurality of pores each provided to form an opening on a surface of said substrate opposing said fluid resin; and
    a film, formed along the inner wall surface of each of said plurality of pores at least around said opening without obstructing said each of said plurality of pores, containing a second material consisting of an organic material and having excellent unwettability against said fluid resin,
    wherein, said first material and said second material are hybridized with each other, such that said inorganic material and said organic material are fused with each other over an entire portion of said film at a molecular level.

6. The resin mold according to claim 5, wherein each of said plurality of pores is a communicating hole connecting said surface opposing said fluid resin and the remaining surface with each other.

7. The composite material according to claim 2, wherein each of said plurality of pores is a one-dimensional communicating hole that extends substantially linearly.

8. The composite material according to claim 5, wherein each of the plurality of pores is a one-dimensional communicating hole that extends substantially linearly.

* * * * *